United States Patent
Jain

(10) Patent No.: US 11,457,027 B2
(45) Date of Patent: Sep. 27, 2022

(54) DETECTION OF SUSPICIOUS ACCESS ATTEMPTS BASED ON ACCESS SIGNATURE

(71) Applicant: Aetna Inc., Hartford, CT (US)

(72) Inventor: Salil Kumar Jain, Jackson Heights, NY (US)

(73) Assignee: Aetna Inc., Hartford, CT (US)

( * ) Notice: Subject to any disclaimer, the term of this patent is extended or adjusted under 35 U.S.C. 154(b) by 307 days.

(21) Appl. No.: 16/701,752

(22) Filed: Dec. 3, 2019

(65) Prior Publication Data
US 2021/0168159 A1    Jun. 3, 2021

(51) Int. Cl.
*H04L 29/06*    (2006.01)
*H04L 9/40*    (2022.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
See application file for complete search history.

(56) References Cited

U.S. PATENT DOCUMENTS

| | | | | |
|---|---|---|---|---|
| 9,942,220 | B2 * | 4/2018 | Bajenov | H04L 63/083 |
| 2016/0241576 | A1 * | 8/2016 | Rathod | H04L 63/1425 |
| 2019/0333102 | A1 * | 10/2019 | Soh | G06Q 30/0277 |
| 2020/0137084 | A1 * | 4/2020 | Roy | H04L 63/101 |
| 2020/0228565 | A1 * | 7/2020 | Reverte | G06N 20/00 |
| 2020/0280573 | A1 * | 9/2020 | Johnson | G06F 21/316 |

FOREIGN PATENT DOCUMENTS

| CN | 104065644 A | * | 9/2014 | |
|---|---|---|---|---|
| JP | 2019134465 A | * | 8/2019 | H04L 63/1425 |

* cited by examiner

*Primary Examiner* — Kambiz Zand
*Assistant Examiner* — Afaq Ali
(74) *Attorney, Agent, or Firm* — Leydig, Voit & Mayer, Ltd.

(57) ABSTRACT

A system includes at least one web server, a storage, and a suspicious access attempt detector. The at least one web server is configured to receive and process a plurality of access attempts from a plurality of user devices over a network, and to provide access attempt information corresponding to the plurality of access attempts to a storage, wherein access attempt information for each respective access attempt comprises an access signature corresponding to the respective access attempt. The suspicious access attempt detector configured to: obtain the access attempt information corresponding to the plurality of access attempts from the storage; analyze the access attempt information corresponding to the plurality of access attempts to detect suspicious access attempts out of the plurality of access attempts, wherein analyzing the access attempt information is based on respective access signatures corresponding to the plurality of access attempts; and output a result of the detection.

17 Claims, 7 Drawing Sheets

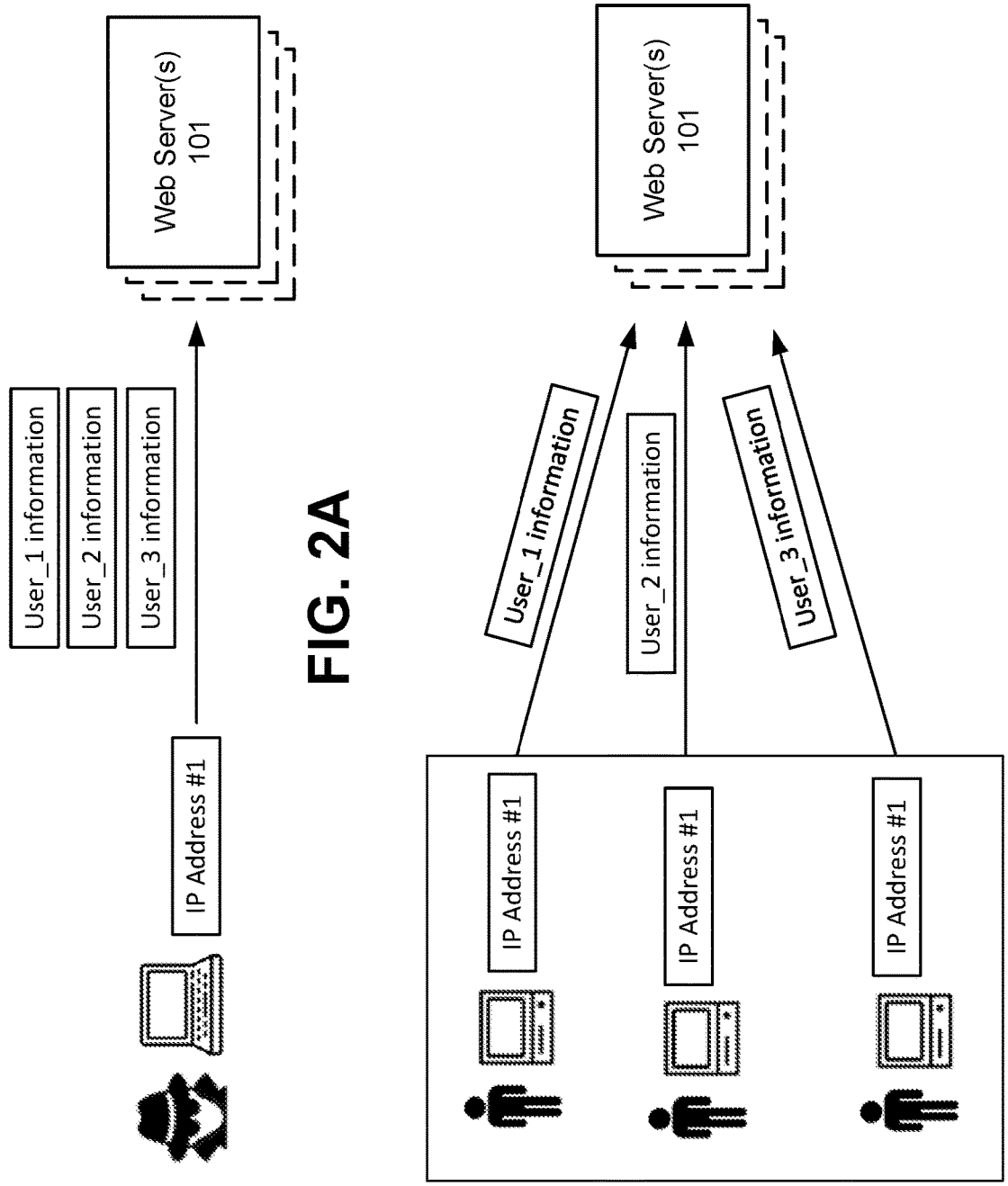

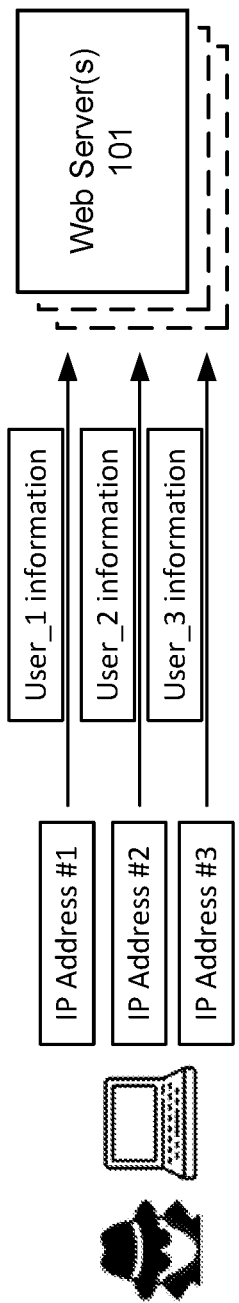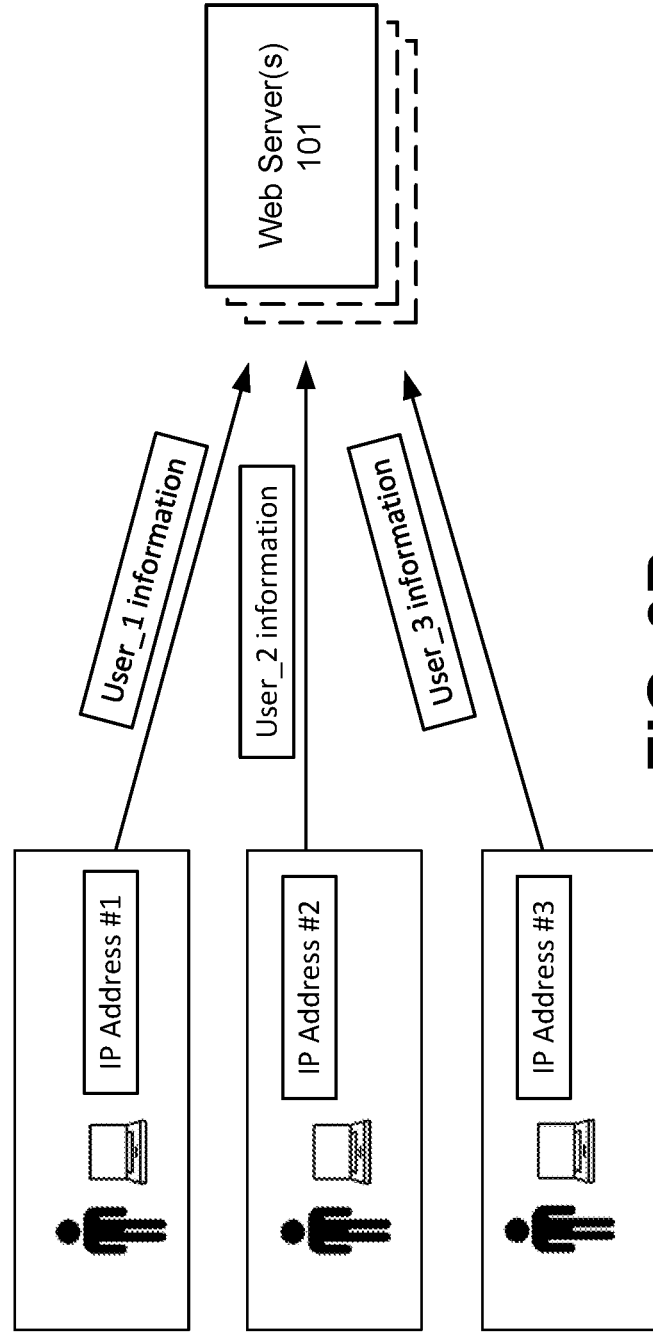

DETECTION OF SUSPICIOUS ACCESS ATTEMPTS BASED ON ACCESS SIGNATURE

BACKGROUND

Identify theft is a major problem affecting millions of people worldwide. There are many ways in which identity theft may occur, including, for example, hacking of online data repositories, phishing, or social engineering to illicitly obtain user information (e.g., personally identifiable information (PII)/protected health information (PHI), authentication credentials, or other user-related information).

Fraudsters who obtain such information may attempt to fraudulently access a user's account (e.g., an account with a financial institution or some other entity) using the obtained user information, for example, by logging into the user's account using the user's authentication credentials, and/or by attempting to take over or establish an account through registration or password reset using PII/PHI or other user-related information (such as user information corresponding to security questions used for the account). The PII/PHI of a user may include, for example, the user's first name, last name, date of birth, social security number, etc.

SUMMARY

In an exemplary embodiment, the present application provides a system. The system includes: at least one web server configured to receive and process a plurality of access attempts from a plurality of user devices over a network, and to provide access attempt information corresponding to the plurality of access attempts to a storage, wherein access attempt information for each respective access attempt comprises an access signature corresponding to the respective access attempt; the storage, wherein the storage is configured to store the access attempt information corresponding to the plurality of access attempts; and a suspicious access attempt detector configured to: obtain the access attempt information corresponding to the plurality of access attempts from the storage; analyze the access attempt information corresponding to the plurality of access attempts to detect suspicious access attempts out of the plurality of access attempts, wherein analyzing the access attempt information is based on respective access signatures corresponding to the plurality of access attempts; and output a result of the detection.

In an exemplary embodiment, the access attempt information for each respective access attempt further comprises an IP address corresponding to the respective access attempt; and analyzing the access attempt information further comprises: applying a filter based on a number of unique access signatures corresponding to a respective IP address; and applying a filter based on a number of unique access attempts corresponding to a respective access signature.

In an exemplary embodiment, analyzing the access attempt information further comprises: applying a trust-based filter to prevent access attempts corresponding to trusted IP addresses from being detected as suspicious access attempts.

In an exemplary embodiment, the trust-based filter is applied before applying the filter based on a number of unique access signatures corresponding to a respective IP address, and the filter based on a number of unique access signatures corresponding to a respective IP address is applied before applying the filter based on a number of unique access attempts corresponding to a respective access signature.

In an exemplary embodiment, analyzing the access attempt information further comprises: determining a number of unique access signatures corresponding to each IP address. And applying the filter based on a number of unique access signatures corresponding to a respective IP address prevents access attempts corresponding to IP addresses for which there are a number of unique access signatures greater than or equal to a threshold number from being detected as suspicious access attempts.

In an exemplary embodiment, analyzing the access attempt information further comprises: determining a number of unique access attempts corresponding to each access signature. And applying the filter based on a number of unique access attempts corresponding to a respective access signature prevents access attempts corresponding to access signatures for which there are a number of unique access attempts less than a threshold number from being detected as suspicious access attempts.

In an exemplary embodiment, applying the filter based on a number of unique access attempts corresponding to a respective access signature further comprises applying a filter based on a number of IP addresses corresponding to the respective access signature.

In an exemplary embodiment, analyzing the access attempt information further comprises: determining a number of unique access attempts corresponding to each access signature. And applying the filter based on a number of unique access attempts corresponding to a respective access signature prevents access attempts corresponding to access signatures for which there are a number of unique access attempts less than a threshold number from being detected as suspicious access attempts, and further prevents access attempts corresponding to access signatures for which at least one IP address does not appear in at least a threshold number unique access attempts from being detected as suspicious access attempts.

In an exemplary embodiment, the suspicious access attempt detector is further configured to cause one or more responsive operations to be executed, wherein the one or more responsive operations include notifying one or more users regarding possible user account compromise.

In an exemplary embodiment, the one or more responsive operations further include disabling or deleting one or more user accounts.

In another exemplary embodiment, the present application provides a method. The method includes: obtaining, by a suspicious access attempt detector, access attempt information corresponding to a plurality of access attempts, wherein access attempt information for each respective access attempt comprises an access signature corresponding to the respective access attempt, and wherein each respective access attempt corresponds to a user device communicating with a network device over a communication network; analyzing, by the suspicious access attempt detector, the access attempt information corresponding to the plurality of access attempts to detect suspicious access attempts out of the plurality of access attempts, wherein analyzing the access attempt information is based on respective access signatures corresponding to the plurality of access attempts; and outputting, by the suspicious access attempt detector, a result of the detection.

In an exemplary embodiment, the access attempt information for each respective access attempt further comprises an IP address corresponding to the respective access attempt;

and analyzing the access attempt information further comprises: applying a filter based on a number of unique access signatures corresponding to a respective IP address; and applying a filter based on a number of unique access attempts corresponding to a respective access signature.

In an exemplary embodiment, analyzing the access attempt information further comprises: applying a trust-based filter to prevent access attempts corresponding to trusted IP addresses from being detected as suspicious access attempts.

In an exemplary embodiment, analyzing the access attempt information further comprises: determining a number of unique access signatures corresponding to each IP address. And applying the filter based on a number of unique access signatures corresponding to a respective IP address prevents access attempts corresponding to IP addresses for which there are a number of unique access signatures greater than or equal to a threshold number from being detected as suspicious access attempts.

In an exemplary embodiment, analyzing the access attempt information further comprises: determining a number of unique access attempts corresponding to each access signature. And applying the filter based on a number of unique access attempts corresponding to a respective access signature prevents access attempts corresponding to access signatures for which there are a number of unique access attempts less than a threshold number from being detected as suspicious access attempts.

In yet another exemplary embodiment, the present application provides one or more non-transitory computer-readable mediums having processor-executable instructions stored thereon. The processor-executable instructions, when executed, facilitate: obtaining access attempt information corresponding to a plurality of access attempts, wherein access attempt information for each respective access attempt comprises an access signature corresponding to the respective access attempt, and wherein each respective access attempt corresponds to a user device communicating with a network device over a communication network; analyzing the access attempt information corresponding to the plurality of access attempts to detect suspicious access attempts out of the plurality of access attempts, wherein analyzing the access attempt information is based on respective access signatures corresponding to the plurality of access attempts; and outputting a result of the detection.

In an exemplary embodiment, the access attempt information for each respective access attempt further comprises an IP address corresponding to the respective access attempt; and analyzing the access attempt information further comprises: applying a filter based on a number of unique access signatures corresponding to a respective IP address; and applying a filter based on a number of unique access attempts corresponding to a respective access signature.

In an exemplary embodiment, analyzing the access attempt information further comprises: applying a trust-based filter to prevent access attempts corresponding to trusted IP addresses from being detected as suspicious access attempts.

In an exemplary embodiment, analyzing the access attempt information further comprises: determining a number of unique access signatures corresponding to each IP address. And applying the filter based on a number of unique access signatures corresponding to a respective IP address prevents access attempts corresponding to IP addresses for which there are a number of unique access signatures greater than or equal to a threshold number from being detected as suspicious access attempts.

In an exemplary embodiment, analyzing the access attempt information further comprises: determining a number of unique access attempts corresponding to each access signature. And applying the filter based on a number of unique access attempts corresponding to a respective access signature prevents access attempts corresponding to access signatures for which there are a number of unique access attempts less than a threshold number from being detected as suspicious access attempts.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2A-2B are illustrations of examples of legitimate and fraudulent multiple user access scenarios involving a single IP address.

FIGS. 3A-3B are illustrations of examples of legitimate and fraudulent multiple user access scenarios involving multiple IP addresses.

DETAILED DESCRIPTION

Figure 1:
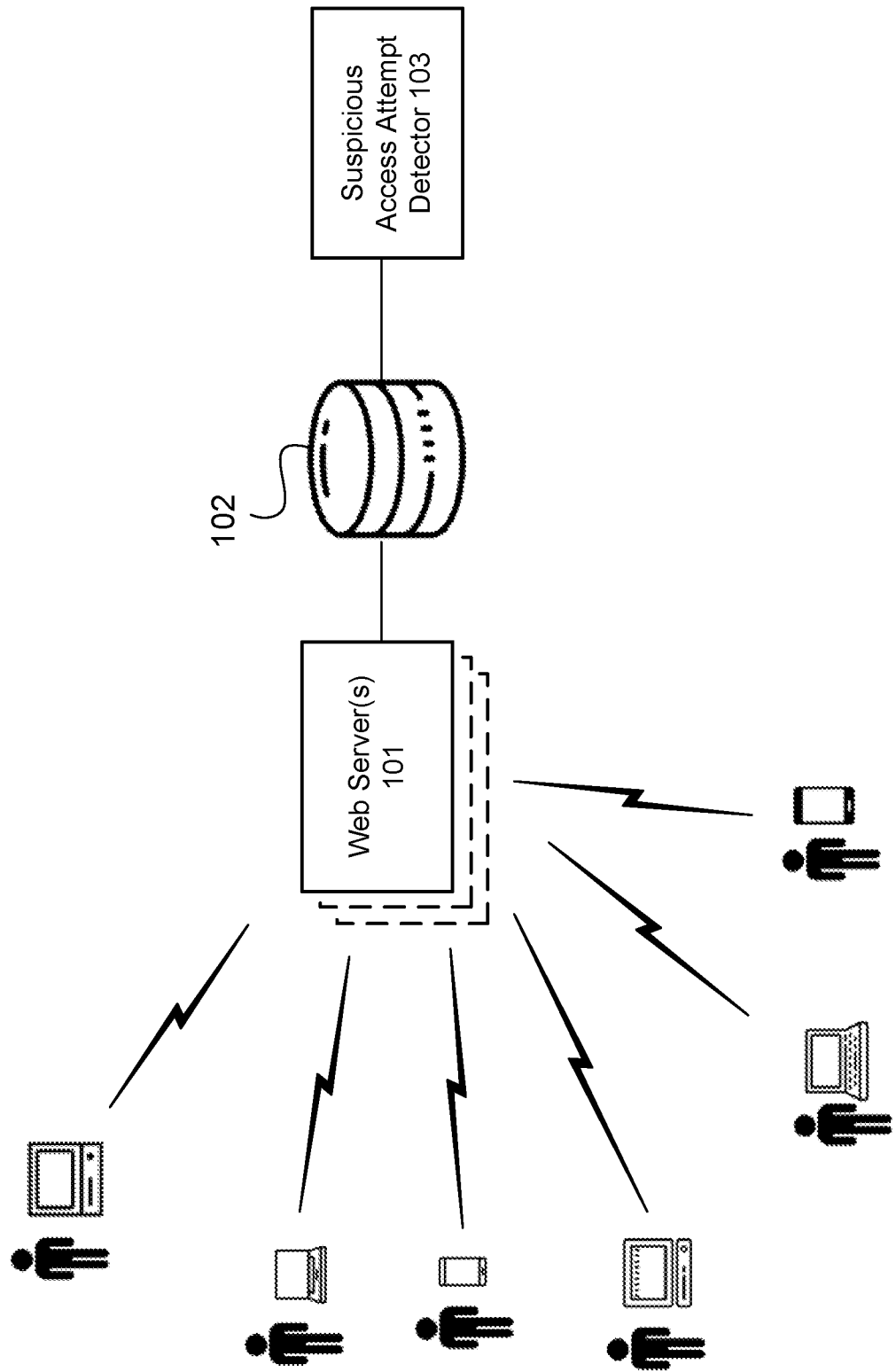
FIG. 1 is a simplified block diagram depicting an exemplary system in accordance with an exemplary embodiment of the present application.

Fraudsters are often able to obtain user information for a large number of users at once, for example, through breaching an online data repository, through mass-email phishing scams, or by purchasing user information in batches from the dark web. The fraudster then makes a plurality of illegitimate access attempts (e.g., log-in attempts, registration attempts, and/or password reset attempts) using the user information from multiple users. These illegitimate access attempts are often made through a single computing device—e.g., the fraudster's personal computer (PC), laptop, server, or some other device. If the illegitimate access attempts are being made over the Internet, the illegitimate access attempts may come from a single Internet Protocol (IP) address or multiple IP addresses (e.g., some fraudsters may configure their computing equipment to constantly or periodically change their IP address to try to avoid detection).

Exemplary embodiments of the present application provide for detecting "multiple user compromise" situations (i.e., situations where user information from multiple users has been compromised and is being used in illegitimate access attempts) based on an access signature corresponding to hardware and/or software being used for the illegitimate access attempts. Multiple user compromise may include one or more different types of access attempts, such as log-in attempts (e.g., logging into a website, server, private network, or any other restricted location or content using a user's log-in information), password reset attempts (e.g., attempting to reset a user's password to gain access to a user account based on PII/PHI or other user-related information, such as user information used in answering security questions on a website), and/or account registration attempts (e.g., using PII/PHI or other information relating to a person to fraudulently create a user account impersonating that person). The access signature corresponding to hardware and/or software being used for the illegitimate access attempts, in certain exemplary embodiments, may be thought of as a "machine and/or browser fingerprint." For example, if a fraudster uses the same computing device plus browser combination for access attempts corresponding to user information from multiple users, a single access signature would be associated with each of the access attempts, regardless of whether the fraudster is using a single IP address or multiple IP addresses.

In exemplary embodiments of the present application, all access attempts, whether legitimate or fraudulent, have an access signature associated therewith corresponding to respective hardware and/or software used for the respective access attempt. Exemplary embodiments of the present application provide for analyzing access attempt information for a plurality of access attempts (including legitimate and/or illegitimate access attempts), each access attempt having an access signature associated therewith, and detecting suspicious access attempts which may correspond to one or more cases of multiple user compromise based on the analysis.

In some situations, there may a case of legitimate multiple user access which may appear similar to a case of multiple user compromise. For example, in the situation of enterprise access (e.g., for an entity such as a business), a plurality of similarly- or identically-configured machines with similarly- or identically-configured browser software may be provided to multiple users such that access attempts from each of the multiple users each have a same access signature. Exemplary embodiments of the present application further provide for ways to distinguish between legitimate cases of multiple user access versus cases of multiple user compromise to avoid false positives. For example, by applying one or more filtering procedures, exemplary embodiments of the present application avoid erroneously flagging the situation of legitimate enterprise access (and other similar legitimate multiple user access situations) as being a case of multiple user compromise.

FIG. 1 is a simplified block diagram depicting an exemplary system in accordance with an exemplary embodiment of the present application. In FIG. 1, various users using various different types of devices perform respective access attempts with one or more web servers 101 over a network, such as the Internet. The access attempts include the provision of respective user information in the context of, for example, a respective user accessing the web server(s) 101 to log-in to an online account associated with the respective user, to register an account for the respective user, or to reset a password for the respective user. In the case of logging in, the user information may include, for example, username and password information for the respective user's account with an entity associated with the web server(s) 101, such as a financial institution, a healthcare or insurance provider, or any other entity with an online presence. In the case of registering an account, the user information may include, for example, PII/PHI or other information relating to the respective user. In the case of resetting a password, the user information may include, for example, information relating to the respective user that is responsive to one or more security questions or other security-related prompts.

The web server(s) 101 obtains access attempt information for each access attempt and sends the access attempt information to a storage 102. The storage 102 may include one or more databases. For example, in one exemplary implementation, the storage 102 may include a database connected to the web server(s) 101 or may include one or more memories of the web server(s) 101. In another example, the storage 102 may include a big data database system having distributed storage across a plurality of computing nodes.

The access attempt information for each access attempt may include information relating to a log-in attempt (e.g., username information), an account registration attempt (e.g., PII data used for the registration), and/or a password reset attempt (e.g., username information). The access attempt information for a respective access attempt may be obtained and stored regardless of whether the respective access attempt was successful or unsuccessful, and the access attempt information for the respective access attempt may further include an indication of whether the respective access attempt was successful or unsuccessful. The access attempt information for each respective access attempt may further include a respective access signature corresponding to hardware and/or software used for the respective access attempt. The access attempt information for each respective access attempt may further include an IP address corresponding to the respective access attempt. The access attempt information for each respective access attempt may further include date and/or time information for each respective access attempt.

An access signature for a respective access attempt may include one or more of the following parameters corresponding to the hardware and/or software used for the respective access attempt: a browser type, a browser version, identification of plug-in(s) installed on the browser, a screen resolution, a processor type, a processor version, a device type, font(s) installed, a language setting, a time zone setting, and/or a canvas fingerprint.

A suspicious access attempt detector 103 is connected to the storage 102 and is configured to obtain access attempt information for a plurality of access attempts from the storage 102. The suspicious access attempt detector 103 analyzes the access attempt information (as will be discussed further below) to detect suspicious access attempts which may correspond to one or more potential cases of multiple user compromise. The suspicious access attempt detector 103 may comprise a computing device such as a server, a personal computer, or other device with processing and communication capabilities, or may comprise a computing system comprising a plurality of computing nodes (such as a big data processing system in which processing functionality is distributed across a plurality of nodes).

In an exemplary implementation, the web server(s) 101, the storage 102, and the suspicious access attempt detector 103 may all be associated with a single entity (e.g., a same organization or institution), and may be interconnected via an internal network of that entity via wired connections and/or wireless connections. In another exemplary implementation, the suspicious access attempt detector 103 and/or the storage system 102 may be operated by a separate entity relative to the entity associated with the web server(s) 101. For example, the suspicious access attempt detector 103 and/or the storage system 102 may be operated by an external security firm to provide cybersecurity services for the entity operating the web server(s) 101.

It will be appreciated that the exemplary system depicted in FIG. 1 is merely an example, and that the principles discussed herein may also be applicable to other situations—for example, including other types of entities, institutions, organizations, devices, systems, and network configurations. For example, in an alternative exemplary configuration, the web server(s) 101 may be configured to perform suspicious access attempt detection such that a separate suspicious access attempt detector 103 as depicted in FIG. 1 would not be needed.

FIGS. 2A-2B are illustrations of examples of legitimate and fraudulent multiple user access scenarios involving a single IP address. FIG. 2A illustrates a case of multiple user compromise where a fraudster uses a single computing device and a single IP address (IP Address #1 in this illustrative example) for multiple access attempts using user information of multiple users (User_1 information, User_2 information, and User_3 information in this illustrative example). FIG. 2B illustrates a case of legitimate multiple user access corresponding to, for example, a business having multiple similarly-configured computers (e.g., same hardware with same browser software) in a single location where the multiple computers use the same IP address (IP Address #1 in this illustrative example). The multiple users may transmit their respective user information (User_1 information, User_2 information, and User_3 information in this illustrative example) using the respective computing devices via the same IP address. Exemplary embodiments of the present application, as will be discussed further below, provide manners of distinguishing between multiple user compromise involving a single IP address (e.g., as illustrated in FIG. 2A) versus legitimate multiple user access involving a single IP address (e.g., as illustrated in FIG. 2B).

FIGS. 3A-3B are illustrations of examples of legitimate and fraudulent multiple user access scenarios involving multiple IP addresses. FIG. 3A illustrates a case of multiple user compromise where a fraudster uses a single computing device and multiple IP addresses (IP Address #1, IP Address #2 and IP Address #3 in this illustrative example) for multiple access attempts using user information of multiple users (User_1 information, User_2 information, and User_3 information in this illustrative example). FIG. 3B illustrates a case of legitimate multiple user access corresponding to, for example, a business having multiple similarly-configured computers (e.g., same hardware with same browser software) in multiple locations where the multiple computers use different IP addresses (IP Address #1, IP Address #2 and IP Address #3 in this illustrative example). The multiple users may transmit their respective user information (User_1 information, User_2 information, and User_3 information in this illustrative example) using the respective computing devices via the different IP addresses. Exemplary embodiments of the present application, as will be discussed further below, also provide manners of distinguishing between multiple user compromise involving multiple IP addresses (e.g., as illustrated in FIG. 3A) versus legitimate multiple user access involving multiple IP addresses (e.g., as illustrated in FIG. 3B).

Figure 4:
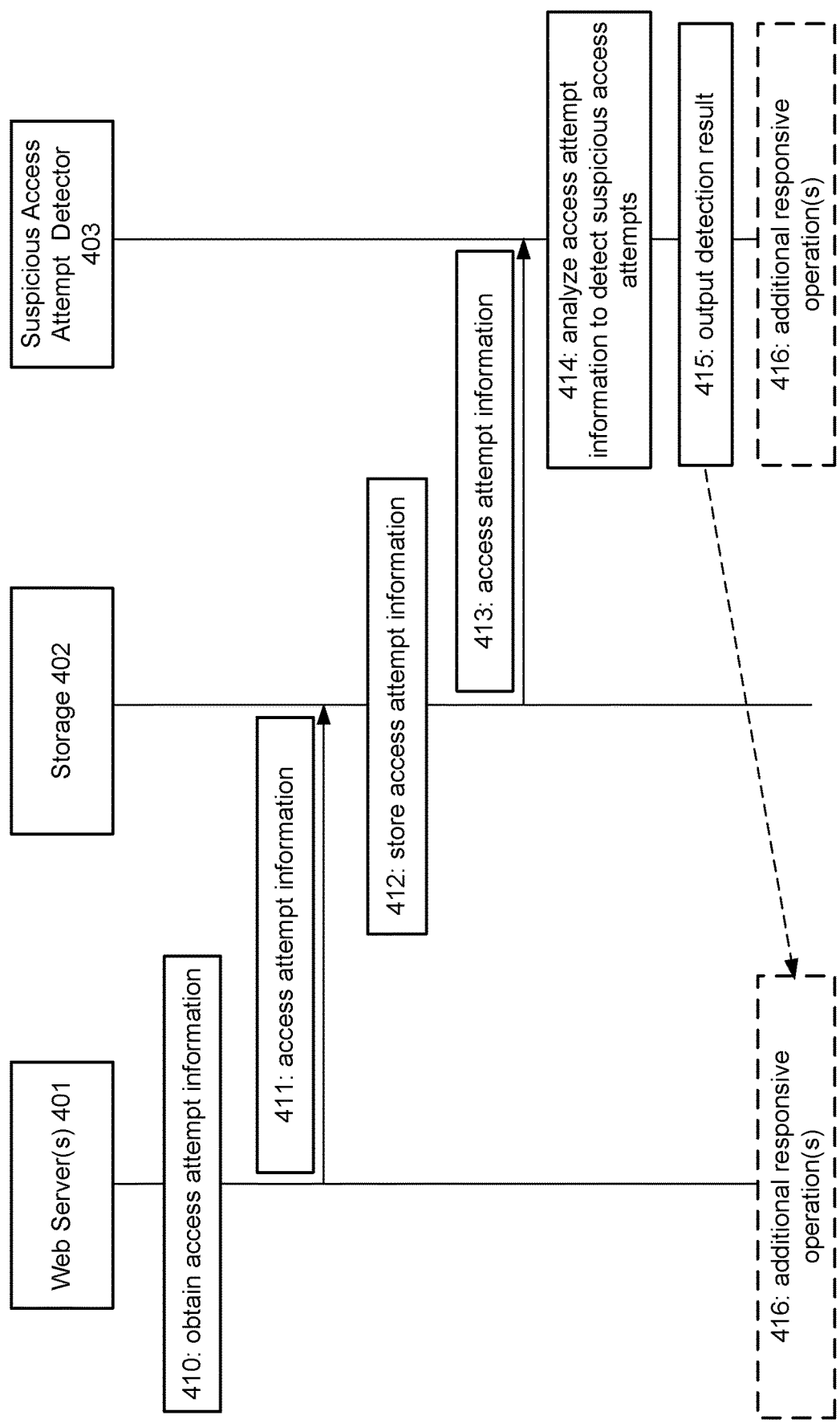
FIG. 4 is a timing diagram depicting an exemplary process in accordance with an exemplary embodiment of the present application.

FIG. 4 is a timing diagram depicting an exemplary process in accordance with an exemplary embodiment of the present application. In FIG. 4, one or more web servers 401 (which may correspond, for example, to web server(s) 101 discussed above in connection with FIG. 1) obtain access attempt information at stage 410. This may include access attempt information corresponding to a plurality of access attempts over a time period (e.g., on the order of thousands of access attempts in a day). At stage 411, the web server(s) 401 send the access attempt information (e.g., as it comes in or periodically in batches) to storage 402 (which may correspond, for example, to storage 102 discussed above in connection with FIG. 1). At stage 412, the storage 402 stores the access attempt information. At stage 413, a suspicious access attempt detector 403 (which may correspond, for example, to suspicious access attempt detector 103 discussed above in connection with FIG. 1) obtains the access attempt information from the storage 402. The suspicious access attempt detector 403 analyzes the access attempt information at stage 414 to detect suspicious access attempts which may correspond to one or more potential cases of multiple user compromise. The analysis performed by the suspicious access attempt detector 403 may be performed periodically (e.g., once per day) or on a rolling basis (e.g., as new access attempt information comes into the storage 402). At stage 415, the suspicious access attempt detector 403 outputs a detection result. Outputting the detection result may include, for example, outputting a detection result on a screen of a device corresponding to the suspicious access attempt detector 403, and/or sending the detection result to another device so as to notify a user of the other device regarding the detection result, so as to cause the other device to execute one or more responsive operations, and/or to display the detection result on the other device.

At stage 416, additional responsive operation(s) may be executed, for example, at the suspicious access attempt detector 403, at the web server(s) 401, or at some other device. For example, an additional responsive operation may be to disable all accounts that have been detected as potentially being compromised due to being subject to a successful suspicious access attempt.

A further additional responsive operation may include performing a further investigation as to one or more accounts detected as being subject to a successful or unsuccessful suspicious access attempt. The further investigation may include outputting information relating to suspicious access attempts on a screen for analysis by an analyst who has experience with identifying fraud (e.g., the analyst may review the information and identify certain indicators of fraud, such as an unrecognized IP address, multiple attempts using unique user PII data with a high failure rate, etc.). The further investigation may also include contacting one or more users (e.g., by sending the user(s) a text message, sending the user(s) an email, or sending an instruction to an agent to call the user(s)) to confirm whether or not an access attempt determined as being suspicious was in fact illegitimate. When there are a large amount of successful suspicious access attempts corresponding to a single access signature, it may be sufficient to perform the further investigation to confirm that the access attempt(s) corresponding to just one user or to just a few users was/were illegitimate, and in response to this confirmation, further responsive operations (such as disabling accounts and/or providing a notification to users) may be applied to all users affected by suspicious access attempts coming from that access signature.

When a user's account has been automatically disabled, the user may further be contacted to provide them with instructions for re-enabling the account. In the case of the user's account being disabled in response to a legitimate access attempt being identified as being suspicious, the user's account may be automatically re-enabled in response to the user confirming that the access attempt was actually legitimate. In the case of the user's account being disabled in response to a successful suspicious access attempt corresponding to actual fraudulent activity, the user may be requested (e.g., via operations performed at the suspicious access attempt detector 403, the web server(s) 401, or some other device) to take some additional security-related actions (such as updating their log-in credentials or updating their security information for password reset). In the case of the user's account being disabled in response to a suspicious account registration attempt which was successful and verified as being fraudulent, the user's account may be automatically deleted.

The present application is not limited to detection of multiple user compromise. Exemplary embodiments of the present application are also able to detect cases of illegitimate multiple registrations—for example, a user creating multiple fake accounts using made-up or falsified information to try to repeatedly take advantage of a promotional offer (such as a "sign-up bonus") or for some other illegitimate reasons. In an exemplary embodiment, the criteria used by the suspicious access attempt detector 403 for detecting suspicious access attempts corresponding to a case of multiple user compromise is also applicable to detecting a case of illegitimate multiple registrations. Thus, the process depicted in FIG. 4 is also applicable to detection of illegitimate multiple registrations, and in case of the detection of a potential case of illegitimate multiple registrations, responsive operation(s) executed at stage 416 may include automatic deletion of the illegitimately registered accounts.

In an exemplary embodiment, the suspicious access attempt detector 403 is able to identify a case of illegitimate multiple registrations (so as to be able to distinguish illegitimate multiple registrations from multiple user compromise) based on cross-checking the information used for the illegitimate multiple registrations with a database containing authentic information. In the event that the information used for the illegitimate multiple registrations cannot be found in the database containing the authentic information, any account that was successfully registered using falsified information may be automatically deleted.

Figure 5:
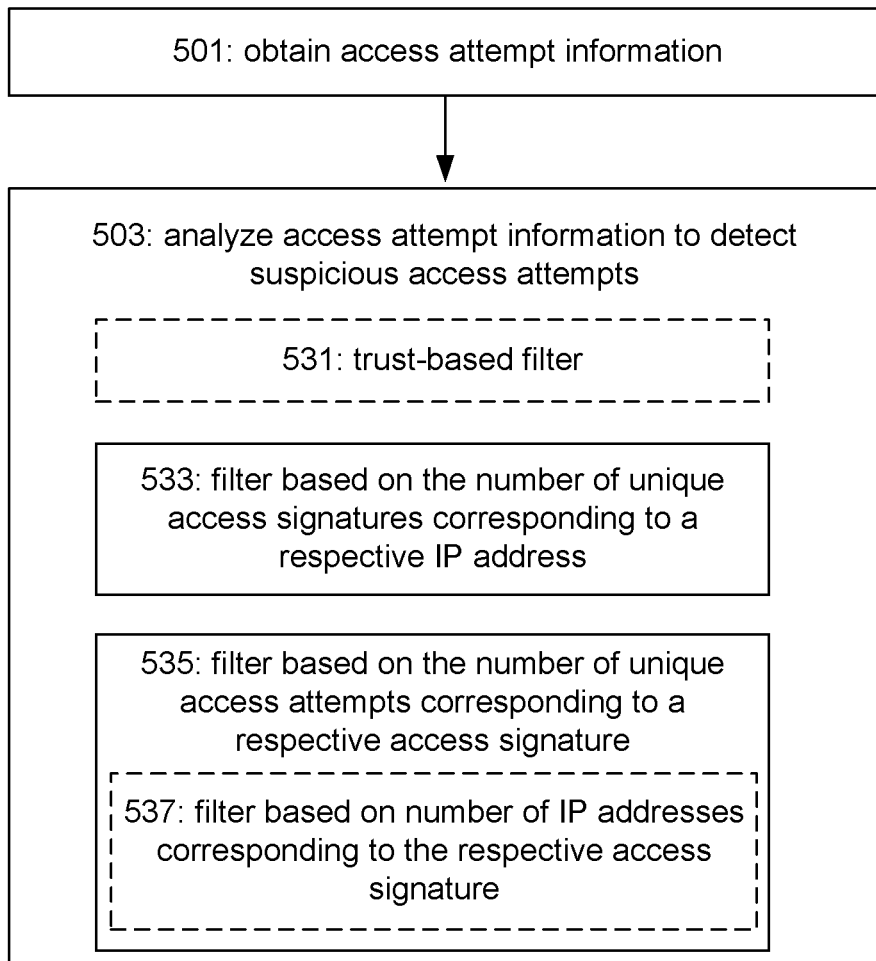
FIG. 5 is a flowchart illustrating an exemplary process for analyzing access attempt information to detect suspicious access attempts in accordance with an exemplary embodiment of the present application.

FIG. 5 is a flowchart illustrating an exemplary process for analyzing access attempt information to detect suspicious access attempts in accordance with an exemplary embodiment of the present application. At stage 501, a device or system such as suspicious access attempt detector 103 or 403 obtains access attempt information for a plurality of access attempts from a storage, such as storage 102 or 402. At stage 503, the obtained access attempt information is analyzed to detect suspicious access attempts based on at least two filter procedures: at stage 533, a filter is applied based on a number of unique access signatures corresponding to a respective IP address, and at stage 535, another filter is applied based on a number of unique access attempts corresponding to a respective access signature.

Optionally, stage 503 may include an additional trust-based filter being applied at stage 531.

Optionally, stage 535 may include a further filter being applied at stage 537 based on a number of IP addresses corresponding to the respective access signature.

The access attempt information for each access attempt includes at least the following information: an access signature, an IP address, and a user identity (ID). The user identity may be, for example, an identification number corresponding to a user, a username, or other information unique to a respective user.

The filter based on a number of unique access signatures corresponding to a respective IP address (stage 533) may be based on comparing the number of unique access signatures corresponding to a respective IP address to a threshold number X of unique access signatures. For example, in an exemplary implementation, X=5, and if an IP address is used by greater than or equal to X (5) unique access signatures in the dataset of access attempt information for access attempts, all access attempts corresponding to that IP address are removed from consideration (i.e., determined as not being suspicious for the purposes of the analysis at stage 503). Thus, situations such as enterprise access where many different users with differently-configured devices are using a common IP address for a large number of access attempts are not flagged as being suspicious for the purposes of this analysis.

The filter based on a number of unique access attempts corresponding to a respective access signature (stage 535) may be based on comparing the number of unique access attempts corresponding to a respective access signature to a threshold number Y of unique access attempts. A unique access attempt for a respective access signature may correspond to an access attempt for the respective access signature which has a different user ID and IP address combination relative to all other access attempts for the respective access signature. For example, in an exemplary implementation, Y=10, and if an access signature has less than Y (10) unique access attempts associated therewith, the access attempts corresponding to that access signature are removed from consideration (i.e., determined as not being suspicious for the purposes of the analysis at stage 503). Thus, situations where one or more users use a single device or multiple devices having an identical access signature for a small number of access attempts are not flagged as being suspicious for the purposes of this analysis.

In the case where the optional trust-based filter at stage 531 and the optional additional filter at stage 537 are not utilized, the result of applying the filter at stage 533 and the filter at stage 535 will be that any access attempt that is not removed from consideration at stages 533 and 535 is detected as being a suspicious access attempt.

The filter at stage 533 and the filter at stage 535 may be applied in any order. Applying the filters in different orders could result in different outcomes with regard to whether or not certain access attempts are detected as being suspicious. For example, if the filter at stage 533 is applied first (resulting in a first modified version of the original dataset obtained at stage 501 in which certain access attempts have been removed from consideration), followed by the filter at stage 535 being applied, the result of stage 503 is that access signatures which are used in greater than or equal to Y unique access attempts within the first modified version of the original dataset are detected as being suspicious. And if the filter at stage 535 is applied first (resulting in a second modified version of the original dataset obtained at stage 501 in which certain access attempts have been removed from consideration), followed by the filter at stage 533 being applied, the result of stage 503 is that access signatures which have IP addresses which are used by less than X unique access signatures within the second modified version of the original dataset are detected as being suspicious.

In an alternative exemplary embodiment, the filters at stage 533 and 535 may be applied simultaneously such that, for example, the result of stage 503 is that access attempts in the original dataset obtained at stage 501 which have IP addresses which are used by less than X unique access signatures and which have access signatures which are used in greater than or equal to Y unique access attempts are detected as being suspicious.

In view of the foregoing, different values for X and Y may be chosen for X and Y depending on the order in which the filters at stages 533 and 535 are applied or depending on whether the filters at stages 533 and 535 are applied simultaneously.

In an exemplary embodiment, a trust-based filter at stage 531 may be further included as part of the analysis of stage 503. The trust-based filter at stage 531 may be based on generating a trust score for a respective IP address (e.g., based on having seen successful access attempts or successful log-in attempts from the IP address in the past) or may be based on checking whether the IP address is in a white list (e.g., the white list may be populated based on IP addresses known to be trustworthy). The trust-based filter at stage 531 allows for distinguishing between certain cases of multiple user compromise (e.g., as depicted in FIGS. 2A and 3A) which may appear to be similar to certain cases of legitimate multiple user access (e.g., as depicted in FIGS. 2B and 3B).

In an exemplary embodiment, the trust-based filter at stage 531 may be applied before applying the filters at stage 533 and 535 to reduce the size of the dataset and increase the processing speed for stages 533 and 535. In other exemplary embodiments, the filters at stage 531, 533 and 535 may be applied in any other order, or simultaneously.

In an exemplary embodiment, an additional filter at stage 537 is applied at stage 535 such that stage 535 includes comparing the number of unique access attempts corresponding to a respective access signature to a threshold number Y of unique access attempts and, if the respective access signature is used in at least the threshold number Y of unique access attempts, checking whether at least one IP address appears in at least a threshold number Z of unique access attempts out of the unique access attempts corresponding to the respective access signature. For example, in an exemplary implementation, Y=10 and Z=2, and if an access signature has less than Y (10) unique access attempts associated therewith, or if an access signature has greater than or equal to Y (10) unique access attempts associated therewith but at least one IP address does not appear in at least Z (2) unique access attempts out of the unique access attempts corresponding to the respective access signature, the access attempts corresponding to that access signature are removed from consideration (i.e., determined as not being suspicious for the purposes of the analysis at stage 503). Thus, situations where one or more users use a single device or multiple devices having an identical access signature for a small number of access attempts are not flagged as being suspicious for the purposes of this analysis, and situations where many users use multiple devices having an identical access signature for a large number of access attempts (e.g., in the case of there being a popular hardware and software combination causing a large number of access attempts coming from different IP addresses to have an identical access signature) are not flagged as being suspicious for the purposes of this analysis.

Figure 6A:
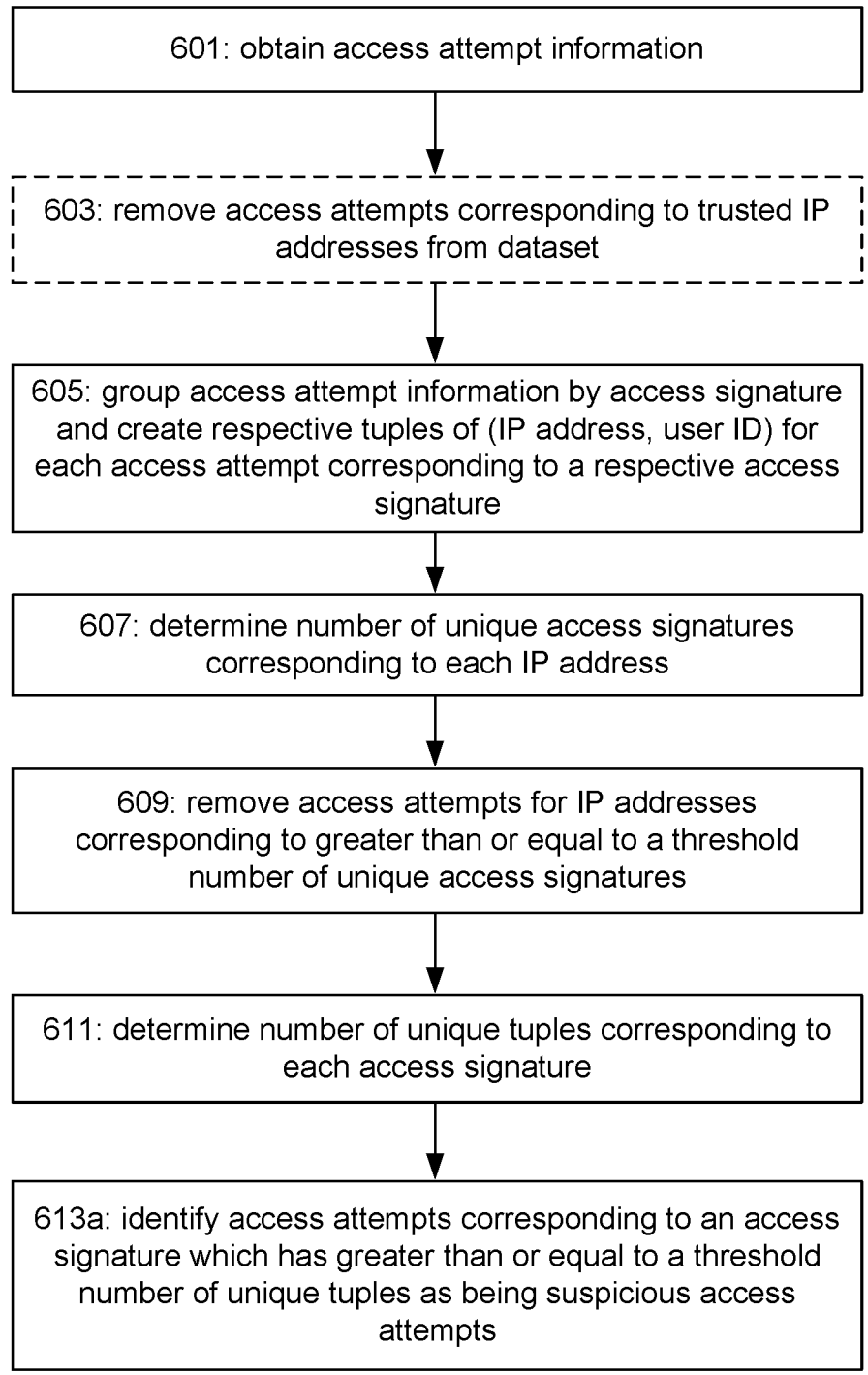
FIGS. 6A-6B are flowcharts illustrating exemplary implementations of the exemplary process for analyzing access attempt information to detect suspicious access attempts depicted in FIG. 5.

FIG. 6A is a flowchart illustrating an exemplary implementation of the exemplary process for analyzing access attempt information to detect suspicious access attempts depicted in FIG. 5.

At stage 601, a device or system such as suspicious access attempt detector 103 or 403 obtains a dataset access attempt information for a plurality of access attempts from a storage, such as storage 102 or 402.

At optional stage 603, access attempts which correspond to trusted IP addresses are removed from the dataset in accordance with the discussion above with regard to stage 531 of FIG. 5.

At stage 605, the access attempt information in the dataset (or the access attempt information remaining in the dataset if stage 603 was performed) is grouped by access signature, with respective tuples of (IP address, user ID) being created for each access attempt corresponding to a respective access signature. Each access signature may thus have a set of unique access attempts mapped thereto—for example, a respective access signature A1 may have the following set of tuples mapped thereto:
Set([(IP1,User1),(IP1,User2),(IP2,User3),(IP3,User1)]).

At stage 607, a number of unique access signatures corresponding to each IP address is determined, and at stage 609, access attempts are removed for IP addresses corresponding to greater than or equal to a threshold number X of unique access signatures. Stages 607 and 609 may be performed in accordance with the discussion above with regard to stage 533 of FIG. 5. For example, in the case of X=5, and if IP1 appears in greater than or equal to 5 mappings (e.g., IP1 appears in the mappings for 7 unique access signatures), access attempts corresponding to IP1 are removed from consideration. The set of tuples mapped to access signature A1 in the example above would thus become Set([(IP2,User3),(IP3,User1)]).

At stage 611, a number of unique tuples corresponding to each access signature is determined, and at stage 613a, access attempts corresponding to an access signature which has greater than or equal to a threshold number Y of unique tuples are detected as being suspicious access attempts. Stages 611 and 613a may be performed in accordance with the discussion above with regard to stage 535 of FIG. 5. For example, in the case of Y=10, the unique access attempts corresponding to access signature A1 would not be detected as being suspicious being the set of tuples mapped to access signature A1 contains only two unique tuples. However, for an access signature A2 for which a set of mapped tuples is Set([(IP4,User4),(IP5,User5),(IP6,User6),(IP7,User7),(IP8, User8),(IP9,User9),(IP10,User10), (IP11,User11),(IP12, User12),(IP13,User13),(IP14,User14),(IP14,User14)]), the access attempts corresponding to the tuples in the set would be detected as being suspicious access attempts because there are greater than Y unique access attempts corresponding to access signature A2.

Figure 6B:
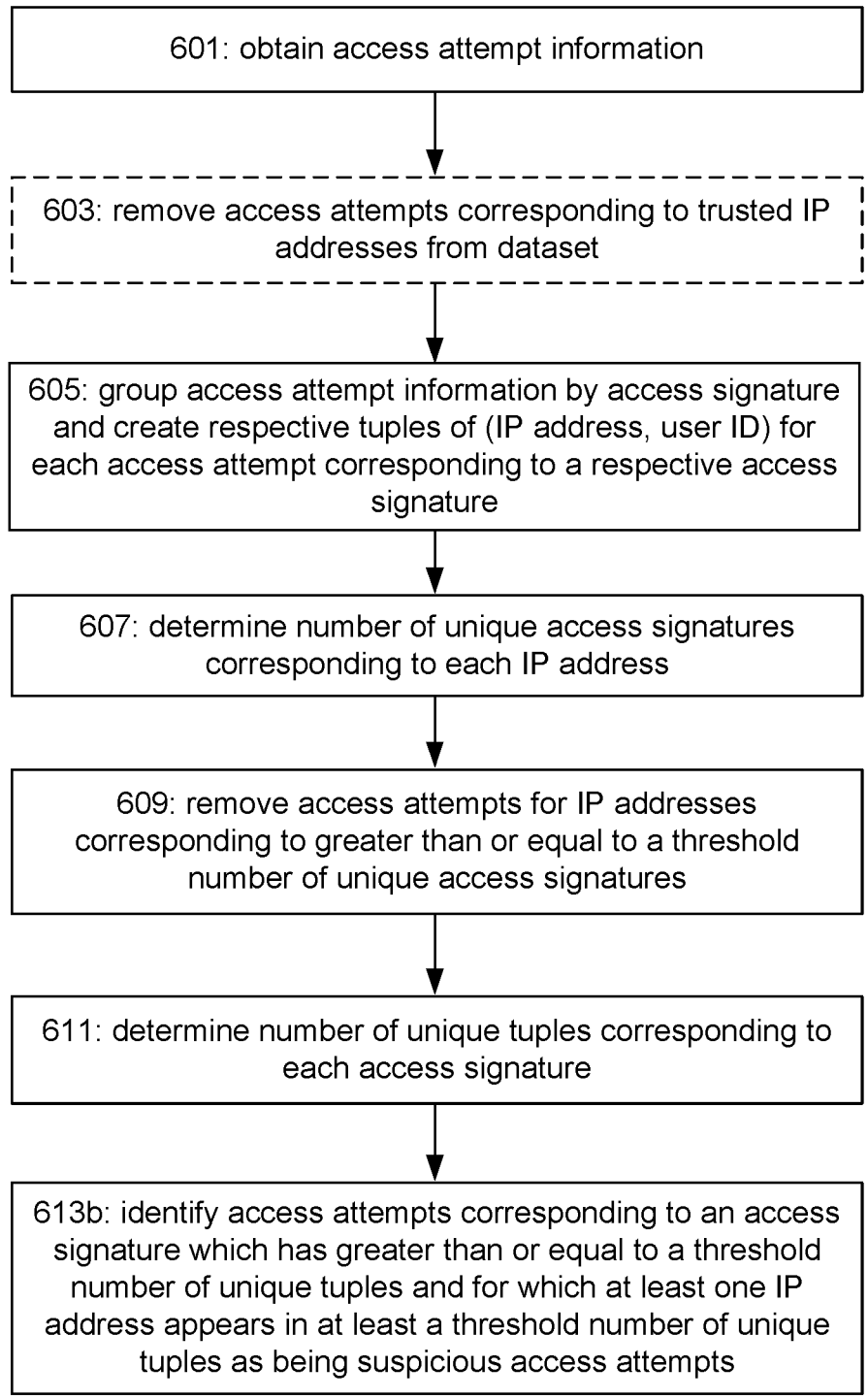

FIG. 6B is another flowchart illustrating an exemplary implementation of the exemplary process for analyzing access attempt information to detect suspicious access attempts depicted in FIG. 5. FIG. 6B is similar to FIG. 6A except that, instead of stage 613a, FIG. 6B includes stage 613b. At stage 613b, access attempts corresponding to an access signature which has greater than or equal to a threshold number Y of unique tuples and for which at least one IP address appears in at least a threshold number Z of unique tuples are detected as being suspicious access attempts. Stages 611 and 613b in FIG. 6B may be performed in accordance with the discussion above with regard to stages 535 and 537 of FIG. 5. For example, in the case of Y=10 and Z=2, the unique access attempts corresponding to access signature A1 would not be detected as being suspicious being the set of tuples mapped to access signature A1 contains only two unique tuples. Additionally, the unique access attempts corresponding to access signature A2 would not be detected as being suspicious because the set of tuples mapped to access signature A2 does not contain at least one IP address appearing in at least two unique tuples. However, for an access signature A3 for which a set of mapped tuples is Set([(IP4,User4),(IP4,User5),(IP4,User6),(IP4,User7), (IP4,User8),(IP4,User9),(IP4,User10), (IP4,User11),(IP4, User12),(IP4,User13),(IP4,User14),(IP4,User14)]), the access attempts corresponding to the tuples in the set would be detected as being suspicious access attempts because there are greater than Y unique access attempts corresponding to access signature A3 and because the set of tuples mapped to access signature A3 has at least one IP address (IP4) which appears in at least Z unique tuples.

Exemplary embodiments of the present application have been tested and demonstrated to be effective. In one example, a suspicious access attempt detector analyzed a dataset comprising 1525 access attempts corresponding to a 1 day time period. Applying a trust-based filter (stage 531) resulted in 717 IP addresses corresponding to 970 access attempts being removed from the dataset. Applying a filter based on the number of unique access signatures corresponding to a respective IP address (stage 533) resulted in 0 access attempts being removed from the dataset. Applying a filter based on the number of unique access attempts corresponding to a respective access signature (stage 535) resulted in 291 access attempts corresponding to 3 access signatures being detected as suspicious (with 144 of the suspicious access attempts corresponding to a first access signature, 135 of the suspicious access attempts corresponding to a second access signature, and 12 of the suspicious access attempts corresponding to a third access signature). The suspicious access attempts were then confirmed as corresponding to fraudulent access attempts.

In another example, the suspicious access attempt detector analyzed a dataset comprising 1602 access attempts corresponding to a 1 day time period. Applying a trust-based filter (stage 531) removed 717 IP addresses corresponding to 1360 access attempts. Applying a filter based on the number of unique access signatures corresponding to a respective IP address (stage 533) resulted in 1 IP address corresponding to 10 access attempts being removed from the dataset. Applying a filter based on the number of unique access attempts corresponding to a respective access signature (stage 535) resulted in 0 access attempts and 0 access signatures being detected as suspicious.

It will be appreciated that the figures of the present application and their corresponding descriptions are merely exemplary, and that the invention is not limited to these exemplary situations.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It will be appreciated that the embodiments of the invention described herein are merely exemplary. Variations of these embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system, comprising:
  at least one web server configured to receive and process a plurality of access attempts from a plurality of user devices over a network, and to provide access attempt information corresponding to the plurality of access attempts to a storage, wherein access attempt information for each respective access attempt comprises an access signature corresponding to the respective access attempt and an IP address corresponding to the respective access attempt;
  the storage, wherein the storage is configured to store the access attempt information corresponding to the plurality of access attempts; and
  a computing device configured to:
    obtain the access attempt information corresponding to the plurality of access attempts from the storage;
    analyze the access attempt information corresponding to the plurality of access attempts to detect suspicious access attempts out of the plurality of access attempts, wherein analyzing the access attempt information is based on respective access signatures corresponding to the plurality of access attempts; and
    output a result of the detection;
  wherein analyzing the access attempt information comprises:
    determining respective numbers of unique access signatures corresponding to respective IP addresses; and
    applying a filter based on the respective numbers of unique access signatures corresponding to respective IP addresses, wherein all access attempts corresponding to IP addresses for which there are a number of unique access signatures greater than or equal to a threshold number are not detected as suspicious access attempts.

2. The system according to claim 1,
wherein analyzing the access attempt information further comprises:
applying a filter based on respective numbers of unique access attempts corresponding to respective access signatures.

3. The system according to claim 2, wherein analyzing the access attempt information further comprises: applying a trust-based filter to prevent access attempts corresponding to trusted IP addresses from being detected as suspicious access attempts.

4. The system according to claim 3, wherein the trust-based filter is applied before applying the filter based on the respective numbers of unique access signatures corresponding to respective IP addresses, and the filter based on the respective numbers of unique access signatures corresponding to respective IP addresses based on a is applied before applying the filter based on the respective numbers of unique access attempts corresponding to respective access signatures.

5. The system according to claim 2, wherein analyzing the access attempt information further comprises: determining the respective numbers of unique access attempts corresponding to respective access signatures; and
wherein based on applying the filter based on the respective numbers of unique access attempts corresponding to respective access signatures, access attempts corresponding to access signatures for which there are a number of unique access attempts less than a threshold number are not detected as suspicious access attempts.

6. The system according to claim 1, wherein analyzing the access attempt information further comprises:
applying a filter based on respective numbers of unique access attempts corresponding to respective access signatures and respective numbers of times respective IP addresses appear in the unique access attempts corresponding to respective access signatures.

7. The system according to claim 6, wherein analyzing the access attempt information further comprises: determining the respective numbers of unique access attempts corresponding to respective access signatures and determining the respective numbers of times respective IP addresses appear in the unique access attempts corresponding to respective access signatures; and
wherein based on applying the filter based on the respective numbers of unique access attempts corresponding to respective access signatures and the respective numbers of IP addresses corresponding to respective access signatures, access attempts corresponding to access signatures for which a respective number of unique access attempts is greater than or equal to a threshold number of unique access attempts and for which a respective IP address appears in unique access attempts for the respective access signature more than a threshold number of times are detected as being suspicious access attempts.

8. The system according to claim 1, wherein the computing device is further configured to cause one or more responsive operations to be executed, wherein the one or more responsive operations include notifying one or more users regarding possible user account compromise.

9. The system according to claim 8, wherein the one or more responsive operations further include disabling or deleting one or more user accounts.

10. A method, comprising:
obtaining, by a suspicious access attempt detector, access attempt information corresponding to a plurality of access attempts, wherein access attempt information for each respective access attempt comprises an access signature corresponding to the respective access attempt, and wherein each respective access attempt corresponds to a user device communicating with a network device over a communication network;
analyzing, by the suspicious access attempt detector, the access attempt information corresponding to the plurality of access attempts to detect suspicious access attempts out of the plurality of access attempts, wherein analyzing the access attempt information is based on respective access signatures corresponding to the plurality of access attempts; and
outputting, by the suspicious access attempt detector, a result of the detection;
wherein analyzing the access attempt information comprises:
determining respective numbers of unique access attempts corresponding to respective access signatures; and
applying a filter based on the respective numbers of unique access attempts corresponding to respective access signatures, wherein access attempts corresponding to access signatures for which there are a number of unique access attempts less than a threshold number are not detected as suspicious access attempts.

11. The method according to claim 10, wherein the access attempt information for each respective access attempt further comprises an IP address corresponding to the respective access attempt; and
wherein analyzing the access attempt information further comprises:
applying a filter based on respective numbers of unique access signatures corresponding to respective IP addresses.

12. The method according to claim 11, wherein analyzing the access attempt information further comprises: applying a trust-based filter to prevent access attempts corresponding to trusted IP addresses from being detected as suspicious access attempts.

13. The method according to claim 11, wherein analyzing the access attempt information further comprises: determining respective numbers of unique access signatures corresponding to respective IP addresses; and
wherein based on applying the filter based on the respective numbers of unique access signatures corresponding to respective IP addresses, access attempts corresponding to IP addresses for which there are a number of unique access signatures greater than or equal to a threshold number are not detected as suspicious access attempts.

14. One or more non-transitory computer-readable mediums having processor-executable instructions stored thereon, wherein the processor-executable instructions, when executed, facilitate:
obtaining access attempt information corresponding to a plurality of access attempts, wherein access attempt information for each respective access attempt comprises an access signature corresponding to the respective access attempt and an IP address corresponding to the respective access attempt, and wherein each respective access attempt corresponds to a user device communicating with a network device over a communication network;

analyzing the access attempt information corresponding to the plurality of access attempts to detect suspicious access attempts out of the plurality of access attempts, wherein analyzing the access attempt information is based on respective access signatures corresponding to the plurality of access attempts; and outputting a result of the detection;

wherein analyzing the access attempt information comprises:

determining respective numbers of unique access attempts corresponding to respective access signatures and determining the respective numbers of times respective IP addresses appear in the unique access attempts corresponding to respective access signatures; and applying a filter based on the respective numbers of unique access attempts corresponding to respective access signatures and the respective numbers of IP addresses corresponding to respective access signatures, wherein based on applying the filter, access attempts corresponding to access signatures for which a respective number of unique access attempts is greater than or equal to a threshold number of unique access attempts and for which a respective IP address appears in unique access attempts for the respective access signature more than a threshold number of times are detected as being suspicious access attempts.

15. The one or more non-transitory computer-readable mediums according to claim 14, wherein analyzing the access attempt information further comprises:

applying a filter based on respective numbers of unique access signatures corresponding to respective IP addresses.

16. The one or more non-transitory computer-readable mediums according to claim 15, wherein analyzing the access attempt information further comprises: applying a trust-based filter to prevent access attempts corresponding to trusted IP addresses from being detected as suspicious access attempts.

17. The one or more non-transitory computer-readable mediums according to claim 15, wherein analyzing the access attempt information further comprises: determining respective numbers of unique access signatures corresponding to respective IP addresses; and wherein based on applying the filter based on the respective numbers of unique access signatures corresponding to respective IP addresses, access attempts corresponding to IP addresses for which there are a number of unique access signatures greater than or equal to a threshold number are not detected as suspicious access attempts.

* * * * *